(12) United States Patent
Ripberger

(10) Patent No.: US 8,819,351 B2
(45) Date of Patent: Aug. 26, 2014

(54) MANAGEMENT OF HOST PASSTHROUGH AND SESSION COMMANDS USING RESOURCE GROUPS

(75) Inventor: Richard A. Ripberger, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/493,807

(22) Filed: Jun. 11, 2012

(65) Prior Publication Data

US 2012/0254571 A1 Oct. 4, 2012

Related U.S. Application Data

(63) Continuation of application No. 12/964,699, filed on Dec. 9, 2010.

(51) Int. Cl.
*G06F 12/00* (2006.01)

(52) U.S. Cl.
USPC .......................................................... 711/152

(58) Field of Classification Search
None
See application file for complete search history.

(56) References Cited

U.S. PATENT DOCUMENTS

| | | | |
|---|---|---|---|
| 5,765,154 A | 6/1998 | Horikiri et al. | |
| 5,905,245 A | 5/1999 | Tanaka | |
| 6,393,485 B1 | 5/2002 | Chao et al. | |
| 6,438,705 B1 | 8/2002 | Chao et al. | |
| 6,543,690 B2 | 4/2003 | Leydier et al. | |
| 7,228,351 B2 | 6/2007 | Arwe | |
| 7,340,646 B2 | 3/2008 | Haustein et al. | |
| 7,685,206 B1 * | 3/2010 | Mathew et al. | 707/785 |
| 2003/0036886 A1 * | 2/2003 | Stone | 702/188 |
| 2006/0069889 A1 | 3/2006 | Nagaya et al. | |
| 2008/0168473 A1 | 7/2008 | Armstrong et al. | |
| 2009/0292843 A1 | 11/2009 | Haban et al. | |
| 2010/0251252 A1 * | 9/2010 | Laverone et al. | 718/104 |

OTHER PUBLICATIONS

Stephen Chong et al., "Secure Web Applications via Automatic Partitioning," ACM 978-1-59593-591-5/07/0010, 2007, pp. 31-44.
Johnson Kin et al., "A Technique for QoS-based System Partitioning,"IEEE ISBN 0-7803-5974-7, 2000, pp. 241-246.
Carol Anderer et al., "Multimedia Magic: Moving Beyond Text," ACM 978-1-59593-634-9/07/0010, 2007, pp. 1-3.
Marijn Janssen et al., "Issues in Relationship Management for Obtaining the Benefits of a Shared Service Center," ACM 1-58113-930-06/04/10, 2004, pp. 219-228.
Extron Electronics, "SW USB Series—Two and Four Input USB Switches," 2008, 4 pages.
"Home Digital Network Interface Specification With Copy Protection," The Society of Cable Telecommunications Engineers (SCTE), 2010, 33 pages.
U.S. Appl. No. 12/964,668, filed Dec. 9, 2010, entitled "Partitioning Management of System Resources Across Multiple Users".

(Continued)

*Primary Examiner* — Brian Peugh
(74) *Attorney, Agent, or Firm* — Griffiths & Seaton PLLC

(57) ABSTRACT

For at least one storage resource object associated with at least one of the plurality of resource groups by a resource group attribute, at least one policy is defined for limiting host requests to the storage resources in the at least one of the plurality of resource groups to prevent an issuance of the host requests to an unowned one of the storage resources.

8 Claims, 7 Drawing Sheets

(56) References Cited

OTHER PUBLICATIONS

U.S. Appl. No. 12/964,675, filed Dec. 9, 2010, entitled "Hierarchical Multi-Tenancy Management of System Resources in Resource Groups".

U.S. Appl. No. 12/964,684, filed Dec. 9, 2010, entitled "Management of Copy Services Relationships Via Policies Specified on Resource Groups".

* cited by examiner

US 8,819,351 B2

MANAGEMENT OF HOST PASSTHROUGH AND SESSION COMMANDS USING RESOURCE GROUPS

CROSS-REFERENCE TO RELATED APPLICATIONS

This application is a Continuation of U.S. patent application Ser. No. 12/964,699, filed on Dec. 9, 2010.

BACKGROUND OF THE INVENTION

1. Field of the Invention

The present invention relates in general to computers, and more particularly to various embodiments for management of host passthrough and session commands using resource groups in a computing storage environment.

2. Description of the Related Art

Computers and computer systems are found in a variety of settings in today's society. Computing environments and networks may be found at home, at work, at school, in government, and in other settings. Computing environments increasingly store data in one or more storage environments, which in many cases are remote from the local interface presented to a user.

These computing storage environments may use many storage devices such as disk drives, often working in concert, to store, retrieve, and update a large body of data, which may then be provided to a host computer requesting or sending the data. In some cases, a number of data storage subsystems are collectively managed to provide storage for a number of host systems. Each host system provides one or more host logical partitions that are each capable of running an operating system that supports running one or more applications. Each host logical partition is allowed to access certain storage devices on the data storage subsystems. In this way, a general purpose computing environment allows the processing and storage resources of the configuration to be partitioned and assigned to various workloads associated with one or more applications. In some environments, a set of workloads may be associated with a specific tenant that is using a subset of the computing environment such that there may be multiple tenants that are concurrently running on various subsets within the environment. In this way, a general purpose multi-host system and multi-storage system computing environment can be configured to support multi-tenancy or multiple workloads.

In some situations, data storage is provided locally and also provided to a remote storage environment to enhance data reliability by providing redundancy. In these situations, several instances of data may be stored in multiple locations to provide for failsafe recovery. Storage environments such as network attached storage (NAS) and storage area networks (SAN) allow for these implementations, and for the implementation and maintenance of a larger amount of storage. SAN, NAS and similar systems are increasingly used for supplying a variety of services, such as email, database, applications, and other services. Data storage subsystems also are increasingly supporting the ability to perform outboard replication across SANs, LANs, and WANs to facilitate the replication of data for backup or mirroring purposes.

SUMMARY OF THE DESCRIBED EMBODIMENTS

In the multi-tenancy/multi-host generalized storage environment previously introduced, it is desirable for users to control actions taken in such environments such that operations of a given tenant (that are unwanted by other tenants) does not effect the other tenants. A general mechanism to allow for management of such operations by virtue of policies established for storage resources in the storage environment is desirable.

Accordingly, and in view of the foregoing, various embodiments for prescribing operations for storage resources organized into a plurality of resource groups in a computing storage environment are provided. A resource group is a collection of resources (e.g. volumes, etc.) that can be assigned a set of policies via the resource group attributes. In one embodiment, by way of example only, for at least one storage resource object associated with at least one of the plurality of resource groups by a resource group attribute, at least one policy is defined for limiting host requests to the storage resources in the at least one of the plurality of resource groups to prevent an issuance of the host requests to an unowned one of the storage resources.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
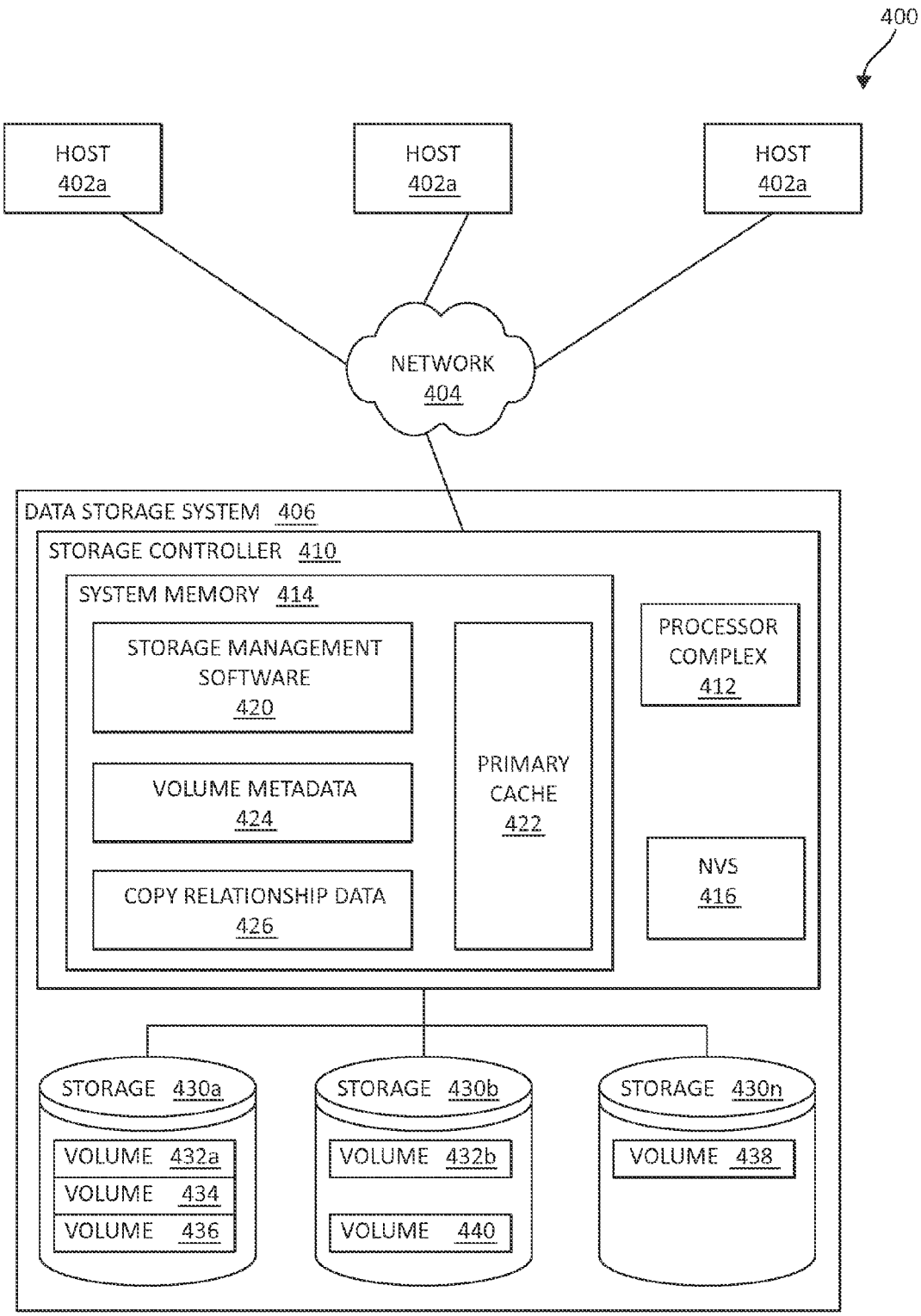
FIG. 1 is a block diagram illustrating a portion of an exemplary computing storage environment.

The illustrated embodiments provide mechanisms for prescribing copy services relationships between a variety of computing storage resources (possibly spread between multiple interconnected storage subsystems, for example) managed by multiple users in a manner supporting a user hierarchy, in a multi-tenancy environment, or a user hierarchy for each tenant. Pursuant to these mechanisms, exemplary embodiments are described that operate to prescribe copy services requests that may operate on storage resources which are different from the storage resource to which the request was issued. By adding resource group attributes to add policy constraints governing the access to these storage resource through indirect mechanisms, the storage resources accessible to a tenant are prescribed as required to support the multi-tenancy environment, as will be further illustrated.

In one exemplary embodiment, the present invention limits host requests for copy services (CS) to prevent the host issuing a request to a resource not associated with the host's ownership. Existing implementations of CS commands allow a host to issue a CS request to a host connection device while the command specifies that the CS operation applies to other devices in the machine. The present invention limits the passthrough from the host connection device to other devices to a prescribed subset of the available devices. Also, the copy services operations have a concepts of sessions used to manage a number of devices for a particular function. For instance, it may be desirable to suspend the copying of data for all the source devices associated a given session at specific point in time in order to maintain consistency across the set of target volume volumes. Multiple tenants operating independently need a way to partition the session numbers used between tenants such that one tenant does not use the other tenants session number. Also, some copy services operations have a concept of a master process that manages a session. For example the IBM Global Mirror function uses a master process to coordinate the management of an asynchronous continuous copy session. There needs to be a way to partition the session numbers associated with the master processes between multiple tenants running independent sessions and additionally to position the master to run on a specific subset of storage controllers involved in the session to manage load balancing of the master process overheads across the set of storage controllers.

In addition, in regards to the overall operation, each resource group has a unique resource group label (RGL), which in one embodiment is a text string. Some resource group attributes specify a resource scope, which in some embodiments is a text string specifying a pattern than can be matched to a resource group label. The passthrough controls in the present invention specifies a resource scope in the connection volume's resource group that is matched with the RGL of the destination volume (when different than the connection volume) to determine if the destination volume is within the scope of the passthrough volume's passthrough control. The session and masters allowed controls do not depend on a resource scope or the RGL. Copy services commands involved with a session or master are issued to a destination LSS and it is that LSS's resource group that contains the control that determines policy for the allowed session or master.

In reference to FIG. 1, one exemplary embodiment 400 of a computing environment including a data storage system 406 is illustrated in block diagram form and represents an exemplary computing environment for implementing the methods described herein. A network 404 connects one or more hosts 402 with a data storage system 406. Data storage system 406 receives input/output requests for writing/reading data from hosts 402, also referred to herein as a "write request" and "read request," and thereby serves as a networked storage resource for hosts 402. In one embodiment, data storage system 406 is implemented as IBM® System Storage™ DS8000™ (trademark of International Business Machines, Corp. or "IBM"). Network 404 may be an I/O interface or fabric such as fibre channel, SCSI, FICON, or ESCON, a SAN, or a wireless network, wired network, a LAN, a WAN, heterogeneous, homogeneous, public (i.e. the Internet), private, or any combination thereof. Hosts 402 may be local or distributed among one or more locations and may be equipped with any type of fabric or network adapter (not shown in FIG. 1) to network 404, such as fibre channel, FICON, ESCON, Ethernet, fiber optic, wireless, or coaxial adapters. Data storage system 406 is accordingly equipped with a suitable fabric or network adapter (not shown in FIG. 1) to communicate via network 404. Data storage system 406 is depicted in FIG. 1 comprising storage controller 410 and storage 430.

To facilitate a clearer understanding of the methods described herein, storage controller 410 is shown in FIG. 1 as a single processing unit, including processor complex 412, system memory 414 and nonvolatile storage ("NVS") 416, which will be described in more detail below. It is noted that in some embodiments, storage controller 410 is comprised of multiple processing units, each with their own processor complex and system memory, and interconnected by a dedicated network within data storage system 406. Storage 430 may be comprised of one or more storage devices, such as storage arrays, which are connected to storage controller 410 by a storage network.

In some embodiments, the devices included in storage 430 are connected in a loop architecture. Storage controller 410 manages storage 430 and facilitates the processing of write and read requests intended for storage 430. The system memory 414 of storage controller 410 stores program instructions and data which processor complex 412 may access for executing functions and method steps associated with managing storage 430. In one embodiment, system memory 414 includes storage management software 420 for executing storage management functions, including the methods and operations described herein. In some embodiments, system memory 414 is allocated for storing volume metadata 424 and copy relationship data 426, which are used for implementing certain virtualization mechanisms, described further below. As shown in FIG. 1, system memory 414 may also include a primary cache 422 for storage 430, also referred to herein as a "cache memory", for buffering "write data" and "read data", which respectively refer to write/read requests and their associated data. In one embodiment, primary cache 422 is allocated in a device external to system memory 414, yet remains accessible by processor complex 412 and serves to provide additional security against data loss, as will be described in detail with respect to FIG. 2 below.

In some embodiments, primary cache 422 is implemented with a volatile memory and coupled to processor complex 412 via a local bus (not shown in FIG. 1) for enhanced performance of data storage system 406. The NVS 416 included in data storage controller is accessible by processor complex 412 and serves to provide additional security against data loss, as will be described in detail with respect to FIG. 2 below. NVS 416, also referred to as a "persistent" cache, or "cache memory", is implemented with nonvolatile memory that may or may not utilize external power to retain data stored therein. In some embodiments, a backup power source (not shown in FIG. 1), such a battery, supplies NVS 416 with sufficient power to retain the data stored therein in case of power loss to data storage system 406. In certain embodiments, the capacity of NVS 416 is less than the total capacity of primary cache 422.

Storage 430 may be physically comprised of one or more storage devices, such as storage arrays. A storage array is a logical grouping of individual storage devices, such as a hard disk. In certain embodiments, storage 430 is comprised of a JBOD (Just a Bunch of Disks) array or a RAID (Redundant Array of Independent Disks) array. A collection of physical storage arrays may be further combined to form a rank, which dissociates the physical storage from the logical configuration. The storage space in a rank may be allocated into logical volumes, which define the storage location specified in a write/read request.

As shown in FIG. 1, a logical volume, or simply "volume," may have different kinds of allocations. Storage 430a, 430b and 430n are shown as ranks in data storage system 406, and are referred to herein as rank 430a, 430b and 430n. Ranks may be local to data storage system 406, or may be located at a physically remote location. In other words, a local storage controller may connect with a remote storage controller and manage storage at the remote location. Rank 430a is shown configured with two entire volumes, 434 and 436, as well as one partial volume 432a. Rank 430b is shown with another partial volume 432b. Thus volume 432 is allocated across ranks 430a and 430b. Rank 430n is shown as being fully allocated to volume 438—that is, rank 430n refers to the entire physical storage for volume 438. From the above examples, it will be appreciated that a rank may be configured to include one or more partial and/or entire volumes. Volumes and ranks may further be divided into so-called "tracks," which represent a fixed block of storage. A track is therefore associated with a given volume and a given rank.

In one embodiment, a copy relationship involves a physical point-in-time copy operation, in which all the data from source volumes to target volumes are physically copied so that the target volume has a copy of the data as of a point-in-time. In some embodiments, a copy relationship involves a logical point-in-time copy operation, in which a logical copy of the source volume is made, after which data are only copied over when necessary. The logical copy relationship provides the advantageous effect of deferring the physical copying, and is performed to minimize the time during which the target and source volumes are inaccessible. One example of a copy relationship is known as FlashCopy® (FlashCopy is a registered trademark of International Business Machines, Corp. or "IBM"). FlashCopy® involves establishing a logical point-in-time relationship between source and target volumes on different ranks.

Once the copy relationship is established, hosts may then have immediate access to data on the source and target volumes, and the data may be copied as part of a background operation. Any new modification of data to tracks on the source rank cause those modified tracks on the source rank to be written to the target rank. Reads to any tracks in the cache that have not been updated with modified data from the source causes the source track to be staged to the cache before access is provided to the track from the cache.

Figure 2:
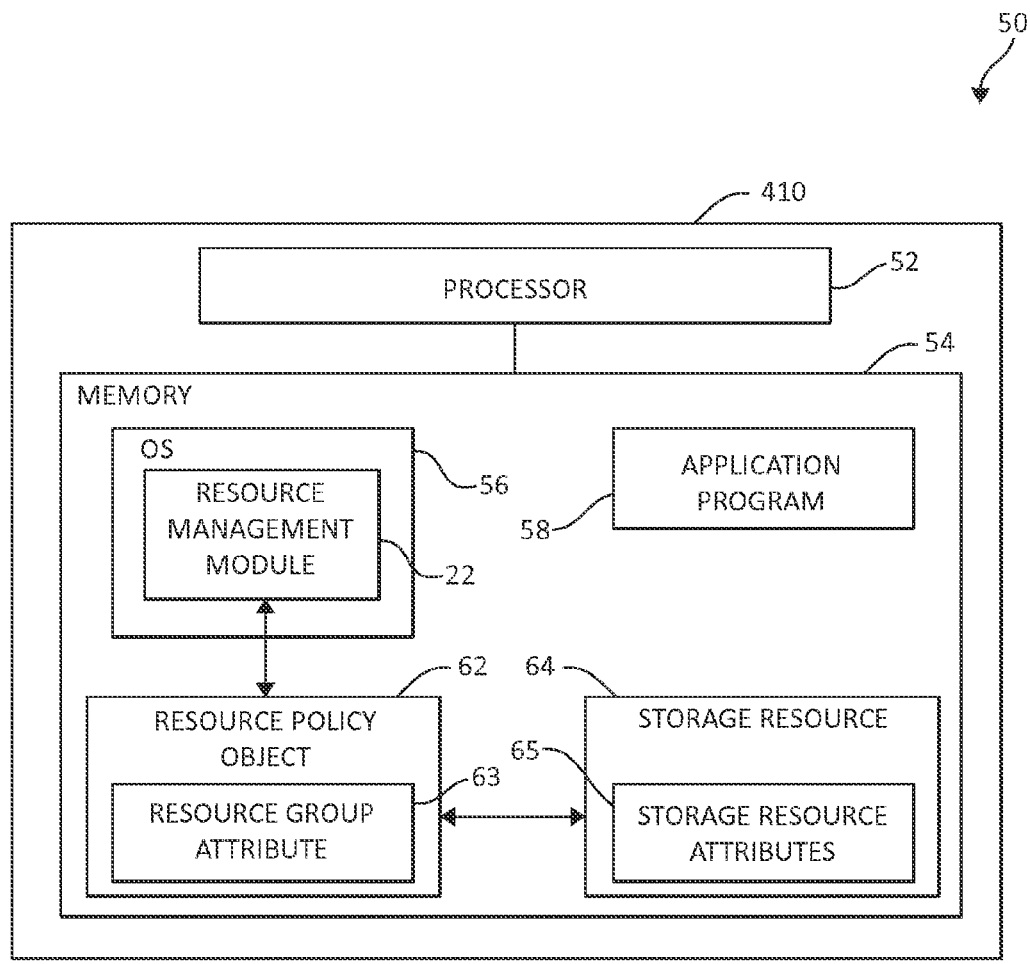
FIG. 2 is a block diagram illustrating an exemplary portion of a storage controller involved with resource group management of the exemplary computing storage environment depicted in FIG. 1.

Turning now to FIG. 2, an exemplary portion 50 of storage controller 410 as also seen in FIG. 1, previously, is illustrated. Portion 50 of storage controller 410 is operable in a computer environment as a portion thereof, in which mechanisms of the following illustrated embodiments may be implemented. It should be appreciated, however, that FIG. 2 is only exemplary and is not intended to state or imply any limitation as to the particular architectures in which the exemplary aspects of the various embodiments may be implemented. Many modifications to the architecture depicted in FIG. 2 may be made without departing from the scope and spirit of the following description and claimed subject matter.

In the illustrated embodiment, storage controller 410 includes a processor 52 and a memory 54, such as random access memory (RAM). The storage controller 410 may be operatively coupled to several components not illustrated for purposes of convenience, including a display, which presents images such as windows to the user on a graphical user interface, a keyboard, mouse, printer, and the like. Of course, those skilled in the art will recognize that any combination of the above components, or any number of different components, peripherals, and other devices, may be used with the storage controller 410.

In the illustrated embodiment, the storage controller 410 operates under control of an operating system (OS) 56 (e.g. AIX, z/OS, OS/2, LINUX, UNIX, WINDOWS, MAC OS) stored in the memory 54, and interfaces with the user to accept inputs and commands and to present results. In one embodiment of the present invention, the OS 56 facilitates management partitioning functionality according to the present invention. To this end, OS 56 includes a resource management module 22 as previously described, which may be adapted for carrying out various processes and mechanisms in the exemplary methods described following.

The Resource Manager is the 'application' of interest here and it is compiled by the manufacturer before it is put on the machine. The resource management module program may be written in a programming language such as COBOL, PL/1, C, C++, JAVA, ADA, BASIC, VISUAL BASIC, ASSEMBLER, on any other programming language to be translated into code that is executable by the processor 52. In one embodiment, the functionality of the Resource management module may be located in the storage controller nodes rather than the management node.

Data structures 62 and 64 (resource group object 62, and storage resource object 64, respectively) are shown interactional with the resource management module 22 in memory 54. Data structure 62 includes one or more resource group attributes 63 (such as a resource group number, a resource group label, and other resource group policy attributes as will be further described). Data structure 64 includes one or more storage resource attributes 65 (such as a resource number (ID) and a resource group). The resource group attribute associates the storage resource with one and only one resource group. A portion of the functionality of the resource management module 22 is, in one embodiment, to correlate the data structures 64 assigned to a particular storage resource(s) with the storage resources associated resource group 62, including resource group attributes 63 previously described.

To further implement and execute mechanisms and processes according to the present invention, OS 56, in conjunction with the resource management module 22, memory 54, processor 52, data structures 62 and 64, and other computer processing, networking, and storage components, may implement management partitioning mechanisms according to the present invention as will be further described. As one of ordinary skill in the art will appreciate, the mechanisms implemented by resource management module 22 as presently illustrated may be implemented in various forms and architectures. Accordingly, the illustration of resource management module 22 (as well as data structures 62 and 64) in the present figure is again intended to demonstrate logical relationships between possible computing components in the 410, and not to imply a specific physical structure or relationship.

In one embodiment, instructions implementing the operating system 56, and the resource management module 22 are tangibly embodied in a computer-readable medium, which may include one or more fixed or removable data storage devices, such as a zip drive, disk, hard drive, DVD/CD-ROM, digital tape, solid state drives (SSDs), etc. Further, the operating system 56 and the resource management module comprise instructions which, when read and executed by the computing storage environment to perform the steps necessary to implement and/or use the present invention. Resource management module and/or operating system 56 instructions may also be tangibly embodied in the memory 54 and/or transmitted through or accessed by networks 16, 24, (FIG. 1) via various components. As such, the terms "article of manufacture," "program storage device" and "computer program product" as may be used herein are intended to encompass a computer program accessible and/or operable from any computer readable device or media.

Embodiments of the present invention may include one or more associated software application programs 58 that include, for example, functions for managing a distributed computer system comprising a network of computing devices, such as a SAN or NAS as previously described. Accordingly, processor 52 may comprise one or more storage management processors (SMP). The program 58 may operate within a single computer and/or 410 or as part of a distributed computer system comprising a network of computing devices. The network may encompass one or more computers connected via a local area network and/or Internet connection (which may be public or secure, e.g. through a virtual private network (VPN) connection), or via a fibre channel SAN or other known network types as will be understood by those of ordinary skill in the art. As one of ordinary skill in the art will appreciate, the management node portion 50 may comprise computing components visible throughout the distributed computer system, such as components conforming to a lightweight directory access protocol (LDAP). In this manner, the data structure 64 may be listed in an LDAP server, for example.

The portion 50 may, in one embodiment, be adapted to define user accounts (having data such as the aforementioned user ID, password, user resource scope), and provides a mechanism for the system administrator to assign a particular user resource scope to the user account. The functionality of the resource group and user resource scope attribute in relation to the present invention and claimed subject matter will now be further described in more detail.

Each storage resource may be associated with a resource group object. Each storage resource that may be associated with a resource group has a resource group attribute that contains the resource group number of its associated resource group. The resource group object may have other attributes that define policies relative to how the resources in the resource group can be managed. The resource group object, in turn, may have a resource group label attribute that contains a unique identifier for the resource group within the storage controller that is compared to a given resource scope attributes to determine if the resource group is within a the scope specified by the resource scope attribute. In one embodiment, the resource group label is a text string that is semantically structured to allow hierarchical relationships between the resource groups. The resource group attributes (such as the pass through global resource scope, for example), in turn, may specify a resource scope that can be used to determine whether storage resources associated with this resource group can be associated with other resource groups by matching the resource scope value to the resource group labels of other resource groups. The resource scope may be implemented with a similar semantic structure as a resource group label, except that it may contain "wildcard" characters allowing the resource scope to select a specific subset of the full set of resource groups.

While the following exemplary embodiment of a resource scope and resource group label implementation incorporates the text string previously mentioned, it will be apparent to one of ordinary skill in the art that the semantic structure of the string (or a different implementation entirely) is possible. The following exemplary embodiment "A" may be used to support varying hierarchical relationships between resource groups as will be further explained. In this exemplary embodiment, the slash and the period are used as delimiters. The asterisk (*) is used as a "wild card." A token is defined as at least a portion of the text string that may contain any printable characters other than delimiters or the asterisk (*).

In the embodiment A, a resource group label is a text string including one or more parts separated by a slash delimiter. Each part is referred to as a resource group qualifier. The resource group qualifier may be null or consist of one or more tokens separated by a period. At least one resource group qualifier must be non-null. Consider the following examples of resource group labels:

| /vol | A.B.C/vol1 |
|---|---|
| a123/vol1 | A1.B2.test/C.d.vol |

Again referring to exemplary embodiment A, a resource scope is a text string consisting of one or more parts separated by a slash delimiter. Each part is referred to as a resource scope qualifier. The resource scope qualifier may be null or consist of one or more tokens separated by a period. In addition the last character of the last token of any resource scope qualifier may be an asterisk (*). Consider the following examples of resource scope strings:

| * | /* | */* | a*/v* | A1.B2.te*/C.d.vol |
|---|---|---|---|---|
| A1.B2.text/C.d* | A*/C* | a123/vol1 | a123/vol1 | |
| A.B.C/vol1 | A1.B2.test/C.d.vol | | | |

A resource scope is said to match a resource group label if each resource scope qualifier matches each resource group qualifier. A resource scope qualifier matches a resource group qualifier if they are the same string or if the all characters from the beginning of the string up to the character preceding the * in the resource scope qualifier are the same. Thus for example, a resource scope of A*/B* would match any of the following resource group labels: A/B, A1/B, A123/B, A/B1, A.abc/B.def.

The following illustrated embodiments, as previously described, expand the attributes associated with the resource group object to specify policies relative to what copy services relationships may be formed between storage resources, such as volumes. In an embodiment concerning storage volumes, for example, when a request is made to establish a copy service relationship, the two volumes to be involved in the relationship exchange the resource group labels from their associated resource groups. They then check the resource group labels of their copy partner against the policy attributes in their resource group object to verify that they are allowed to participate with this partner. Accordingly, for two volumes A and B forming a relationship, Volume A checks that volume B's resource group label is allowed by the policies in volume A's resource group, and Volume B checks that Volume A's resource group label is allowed by the policies in Volume B's resource group. If both volumes determine that they are allowed to be in a relationship, the relationship is accepted. The resource group policy attributes may be set to control the copy services relationships that are allowed to be formed between a pair of volumes A copy request may be requested through a host I/O interface over the SAN or though a network management interface by a network user.

In some embodiments, the set of volumes that a host system partition can initiate a copy services relationship to may be limited by requiring that the host/client have access to communicate with the source/primary volume via the configuration of the storage subsystem in the case of an open host using SCSI Fibre channel attachment or via the configuration of the host system partition in the case of a zSeries host system using FICON fibre channel or ESCON channel attachments. Since the hosts are limited to primary/source volumes they have access to, and since the relationships that can be formed between source/primary and target/secondary volumes in a copy services relationship is limited to only relationships allowed by the resource group policy, hosts are limited to the primary/source volumes they have authority to manage, and the copy relationships formed by any volume is limited to the relationships allowed by the resource group policies.

In other embodiments pursuant to the current invention, the storage subsystem may provide mechanisms to initiate a copy services request on any storage resource in the storage subsystem by issuing the request to any volume that the host has access to with the request specifying the storage resource(s) that the copy services request applies to. For example the host may issue a request to volume A that requests that volumes B and C establish a copy services relationship. Similarly, the host may issue a request to volume A that requests a logical subsystem other that the logical subsystem associated with volume A be associated with a given session number. In this case, limiting the volumes that the host has direct access to does not limit the storage resources to which a host can issue a copy services request. These type of indirect requests are referred to as a pass through request where the host's connection volume is referred to as the pas through device and the storage resource that the operation affects is referred to as the destination device. In a multi-tenancy environment, there may be cases where pass through operations are desirable given they can be limited.

For instance, if there is a single host that is to manage copy services operations for all tenants, it is desirable to allow that host to passthrough its connection volumes to any volume while all the other hosts should be disabled from pass though to any volume since they are not intended to manage copy services operations. In this case, it would also be desirable to disable those hosts from issuing copy services requests to volumes they have access to as well. In another instance, it may be desirable for a given tenant to only manage the storage resources it has direct access to such that passthrough is disabled. In a third instance, it might be desirable for each tenant to be allowed to issue passthrough operation, but the set of destination devices needs to be limited to a specific subset of the configured storage resources that are assigned to the tenant. All of these instances lead to a need for a mechanism to specify a policy that prescribes the set of storage resources that a given connection volume is allowed access with a pass through operation.

According to aspects of the illustrated embodiments, the policies in the resource group for limiting pass through requests issued may be specified using a resource scope attribute, referred to as the pass-through global resource scope (PGRS), in the resource group associated with the connection device. When a pass through request is issued, the PGRS of the connection device is matched to the resource group label (RGL) of the resource group of the destination device. If the RGL matches the PGRS, the pass through request is allowed to be issued to the destination device for processing. As such, the PGRS attribute specifies a resource scope that is used to identify a set of resource groups that contain the storage resources that are allowed to be a destination device for the connection device. Since the policies associated with a volume may be different than the policies required for a logical subsystem, a passthrough operation request that has a volume as destination device uses the PGRS attribute in the connection volume's resource group to assess the destination volume. A passthrough operation request that has an logical subsystem as the destination device uses the PGRS attribute in the resource group of the connection logical subsystem (i.e. the logical subsystem associated with the connection device) to assess the destination logical subsystem.

In additional embodiments pursuant to the current invention, the storage subsystem may provide mechanisms to initiate a copy services request on any storage resource in the storage subsystem that contains the volume that is the target of a copy service relationship that involves the host's connection volume as the source. For instance, the host first establishes a copy services relationship between a connection volume A (the source) and a target volume B. The host may then issue a copy services request to connection volume A that specifies that the request is to be transferred to the target volume B. Further more, the copy services request attempts to establish a copy services relationship between volumes C and D that reside on the storage subsystem that volume be resides on. This operation is referred to as a remote pass-through operation where the B volume is now operating as a remote connection device (i.e. it is the remote copy of volume A) and the pass through operation occurs between the remote connection volume B and the remote destination device C. In this case, the PGRS attribute in the resource group associated with the remote connection device is used to evaluate the remote destination device.

Figure 3:
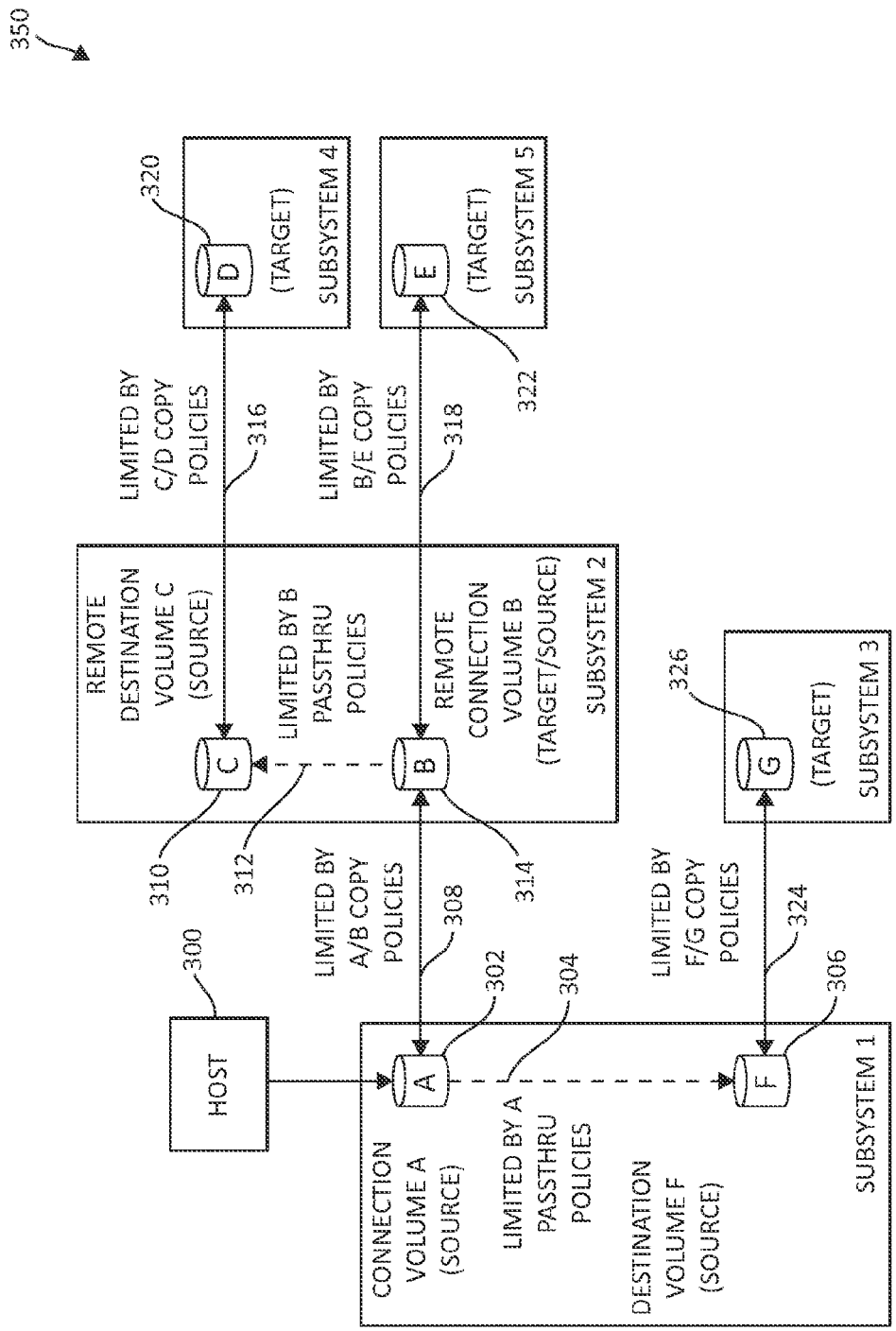
FIG. 3 is a flow diagram of exemplary passthrough command management according to one embodiment of the present invention.

.From the perspective of a given tenant, and in reference to FIG. 3, the access to storage resources is prescribed by the set of connection volumes that the host has access to, the resource group policies that limit the copy services relationships between a pair of logical volumes, and the resource group policies that limit pass through operations. More specifically, the ability of a host (300) to establish a copy service relationship between two volumes is limited to the following cases:

a. A request issued to a connection volume A (302) that establishes a copy relationship (308) between source volume A (302) and target volume B (314) which is prescribed by the copy policies in the resource groups associated with volumes A (302) and B (314).

b. A remote request issued to a connection volume A (302) is sent to remote volume B (314) and establishes a copy relationship (318) between source volume B (314) and target volume E (322) which is prescribed by the copy policies in the resource groups associated with volumes B (314) and E (322).

c. A passthrough request issued to a connection volume A (302) identifies destination volume F (306). The passthrough request is prescribed by the PGRS attribute in volume A (302) resource group. The passthrough request establishes a copy relationship (324) between source volume F (306) and target volume G (326) which is prescribed by the copy policies in the resource groups associated with volumes F (306) and G (326).

d. A remote passthrough request issued to a connection volume A (302) is sent to remote target volume B (314) and identifies remote destination volume C (310). The passthrough request is prescribed by the PGRS attribute in volume B (314) resource group. The passthrough request establishes a copy relationship (316) between source volume C (310) and target volume D (320) which is prescribed by the copy policies in the resource groups associated with volumes C (310) and D (320).

Since the host (300) is limited to directly accessing its defined connection volumes (302), and all access from the connection volume to any target volume (314), destination volume (306), remote volume (314), or remote connection volume (314), or remote destination volume (310) are prescribed by resource group policies, and additionally any access paths from a destination volume (306), remote volume (314), or remote destination volume (310) to a target volume (326, 322, and 320, respectively) are also prescribed by resource group policies, it is demonstrated that any access by the host (300) is limited to a specified subset of the volume resources that it can involve in copy services requests.

As one of ordinary skill in the art will appreciate, the various copy relationships and passthrough relationships supported by the embodiment depicted in FIG. 3 might be expanded to add additional levels of in-direction which can still be regulated by either the copy policies or pass through policies defined to prescribe access to volumes without any loss of access control. For instance, the storage subsystem might support a means to send a request to a remote device's remote device (e.g. in FIG. 3, a request issued to connection volume A (314) that is sent to A's remote device B (314) that is then sent to remote device B's remote device E (322). Such a request could further request the establishment of a relationship with volume E (322) as the source or could request passthrough to yet another volume on subsystem 5. Also, as already described, a copy services operation may apply to a logical subsystem rather than volume and the access to logical subsystems (LSSs) can be equivalently limited per the same passthrough or copy policy controls in the resource groups associated with the connection LSS, the destination LSS, the remote LSS, or the remote destination LSS.

Pursuant to the passthrough control attributes, in one exemplary embodiment, the following characteristics may be associated. First, a null value in the resource scope selects no resource groups and therefore indicates that there are no destination devices allowed. An * value in the resource scope allows any resource group which says that any destination device is allowed. Any other resource scope limits the destination devices to the storage resources associated with a resource group specified by the resource scope. For instance if the passthrough request is from volume A (302) to volume F (306), if volume A's PGRS=Pepsi*, this would match volume F's resource groups's RGL=Pepsi* (e.g. it would match Pepsi, Pepsi.1, or Pepsi.ABC/V1).

As one of ordinary skill in the art will appreciate, a variety of copy services relationship types may each include a set of the aforementioned pass through control attributes. These relationship types may include count key data (CKD) or fixed block (FB) relationship types, continuous copy (PPRC) or point-in-time copy (FC) types, synchronous or asynchronous relationship types, full volumes or datasets types, or any permutation of these types. For instance, there could be a FlashCopy Passthrough control which is specifically applied to passthrough requests that also request the establishment of flash copy requests.

Figure 4:
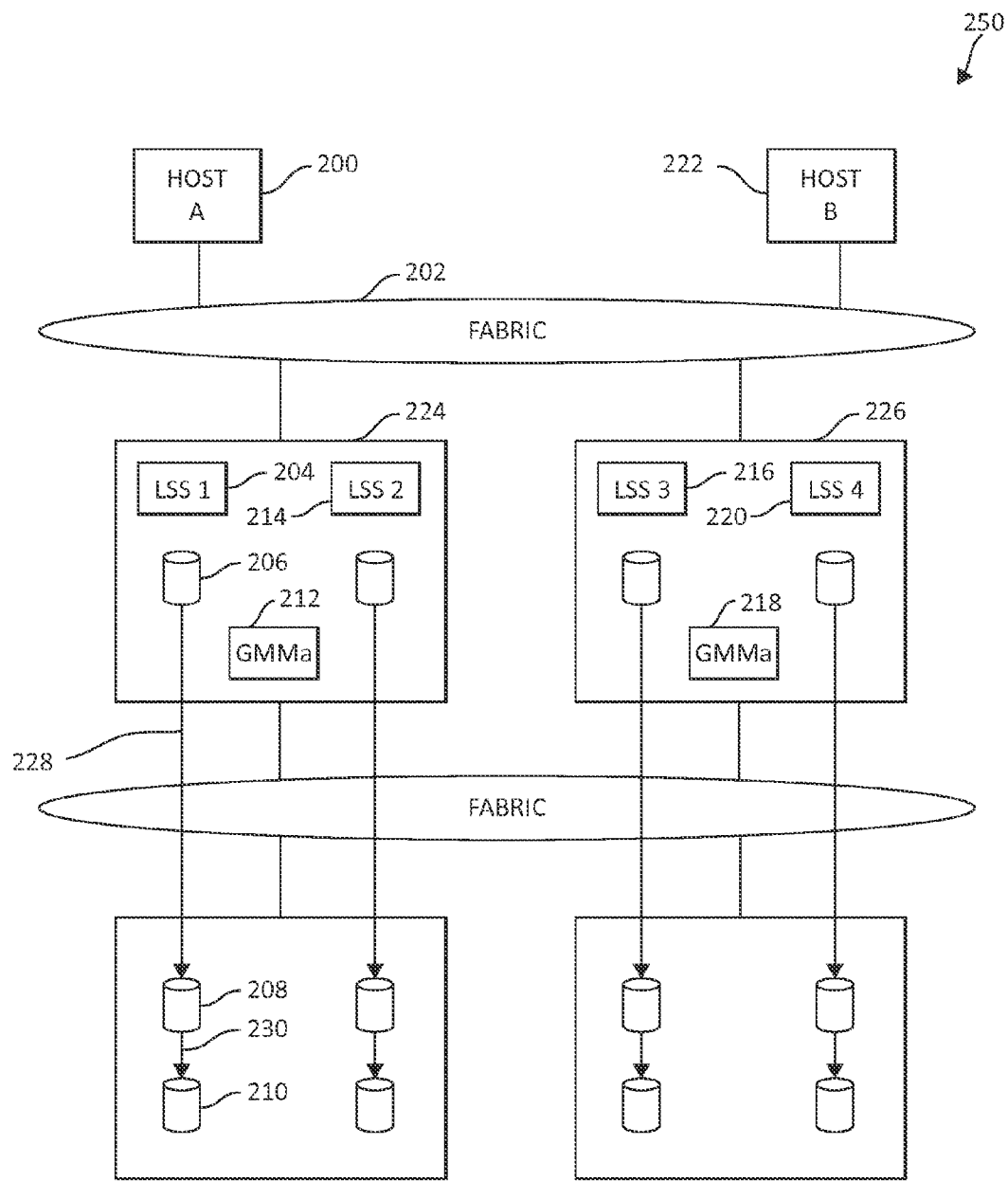
FIG. 4 is an additional flow diagram continuing the exemplary session command management according to one embodiment of the present invention.

To handle introduction of resource group capability, a default resource group (e.g., RG0 with RGL="PUBLIC") may be implemented to which all existing resources are assigned. In one embodiment, the default settings in the default resource group would allow any connection device in RG0 (src scope=PUBLIC) and any destination device in RG0 (PGRS=PUBLIC). Users with authority to modify the storage resources and the resource groups may subsequently create additional resources groups with different policies and non-disruptively change the assignment of existing storage resources or create new storage resources in the new resource groups to effect different policies for storage resources as required Referring to FIG. 4, an exemplary multi-tenancy global mirror environment is depicted. In this example there are two tenants, one is running on hosts A (200) and the other is running on hosts B (222). The host are interconnected through fabric (202) to multiple storage subsystems (224, 226). A global mirror session has a set of primary volumes (206), secondary volumes (208), and tertiary volumes (210) where each primary and secondary volume pair is in a PPRC copy relationship (228) and each secondary volume (208) and tertiary volume (210) is in a FlashCopy relationship (230). A global mirror session is managed by a global mirror master (212, 218) which is a process which coordinates the creation of consistent copies of the primary volumes (206) on the tertiary volumes (210) on a periodic basis using the secondary volume (208) as a means to asynchronously collect a set of changes to the primaries over a window of time at the remote site before creating a flash copy of the secondary volume (208) to establish the consistent copy on the tertiary volume (210). This processing is performed repetitively to keep the tertiary containing a consistent copy of the primary that reflects the primaries at a relatively recent point in time. The operation is such that a given LSS (204, 214, 216, 220) is associated with at most one global mirror session, and all the primary volumes of a global mirror sessions are all associated with LSSs, on one or more storage subsystems, that are associated with the same session and managed by the same global mirror master (212, 218). A global mirror session is identified by a session number, such that the session number is assigned to the LSS that are in the session and also assigned to the global mirror master that is managing that session.

For the purposes of this example, tenant 1 is intended to run a global mirror session that involves LSS 1 (204) and LSS 3 (216) and tenant 2 is intended to run a global mirror session involves LSS 2 (214) and LSS 4 (220). More specifically, we want to limit tenant 1 to running session number 6 and tenant 2 to running session number 22 with tenant 1's global mirror master (212) running on one specific storage subsystem (224) and tenant 2's global mirror master (218) running on another specific storage subsystem (226). In the copy services commands that control global mirror masters there are not inherent mechanisms for the two tenants to avoid accidentally using the same global mirror session numbers or to help coordinate what storage subsystem the global mirror master is running on. In is generally desirable to distribute any global mirror masters over the available storage subsystems so that the overhead of the master processes does not adversely impact any one storage subsystem.

So pertinent to this invention, a global mirror sessions allowed control is added to the resource group that controls the set of session numbers that any LSSs associated with the resource group are allowed to be associated with. In the example, tenant 1's LSSs (204, 126) would be associated with a resource group for tenant 1 (in each respective storage subsystem) that limited the allowed session numbers on the LSS to session 6. If the tenant attempts to assign a session number to an LSS that it has access to a session number other than 6, the request is rejected. Similarly, tenant 2's LSSs (214, 220) would be associated with a resource group for tenant 2 (in each respective storage subsystem) that limited the allowed session numbers on the LSS to session 22. As such the tenants are not allowed to use the same session number on their respective LSSs.

Furthermore, with respect to the global mirror masters, the commands that manage global mirror masters are issued to an LSS and specify a session number. In the example, the session numbers on the tenants LSSs already restrict the session numbers that can be used by the tenant to the session numbers that are assigned to the tenant such that the tenant is limited to managing only the global mirror masters associated with the tenant's allowed session numbers. However, without additional control, there is nothing that limits which storage subsystem the global mirror master might be initiated on. To provide this control, a global mirror masters allowed attribute is added to the resource group that controls the global mirror masters that are allowed to be managed. In this example for tenant 1, the resource group for the tenant 1 on one storage subsystem (224) would allow global mirror master (212) for session 6 to execute. However, the resource group for tenant 1 on another storage subsystem (226) would not allow global mirror master (221) for session 6 to execute. As such, tenant 1 is limited to only running the global mirror master for session number 6 (212) on one storage subsystem (224). Similarly for tenant 2, the global mirror master for session 22 (218) is allowed to run on one subsystem (226) but not on another subsystem (224).

Extrapolating the two controls to a generalized case, any given tenant can be limited to using none, some, or all of the possible session numbers. For the session numbers that it is allowed to use, it can assign any given LSS it has access to any one of the session numbers that it is allowed to use. Independently, any given tenant can be limited to running none, some, or all global mirror masters on any subset of the storage subsystems that it has an accessible LSS on. In order to initiate a given global mirror master on a given storage subsystem, the LSS that the master is managed through must be allowed to use the session number via both the allowed sessions control and the allowed master control.

Figure 5:
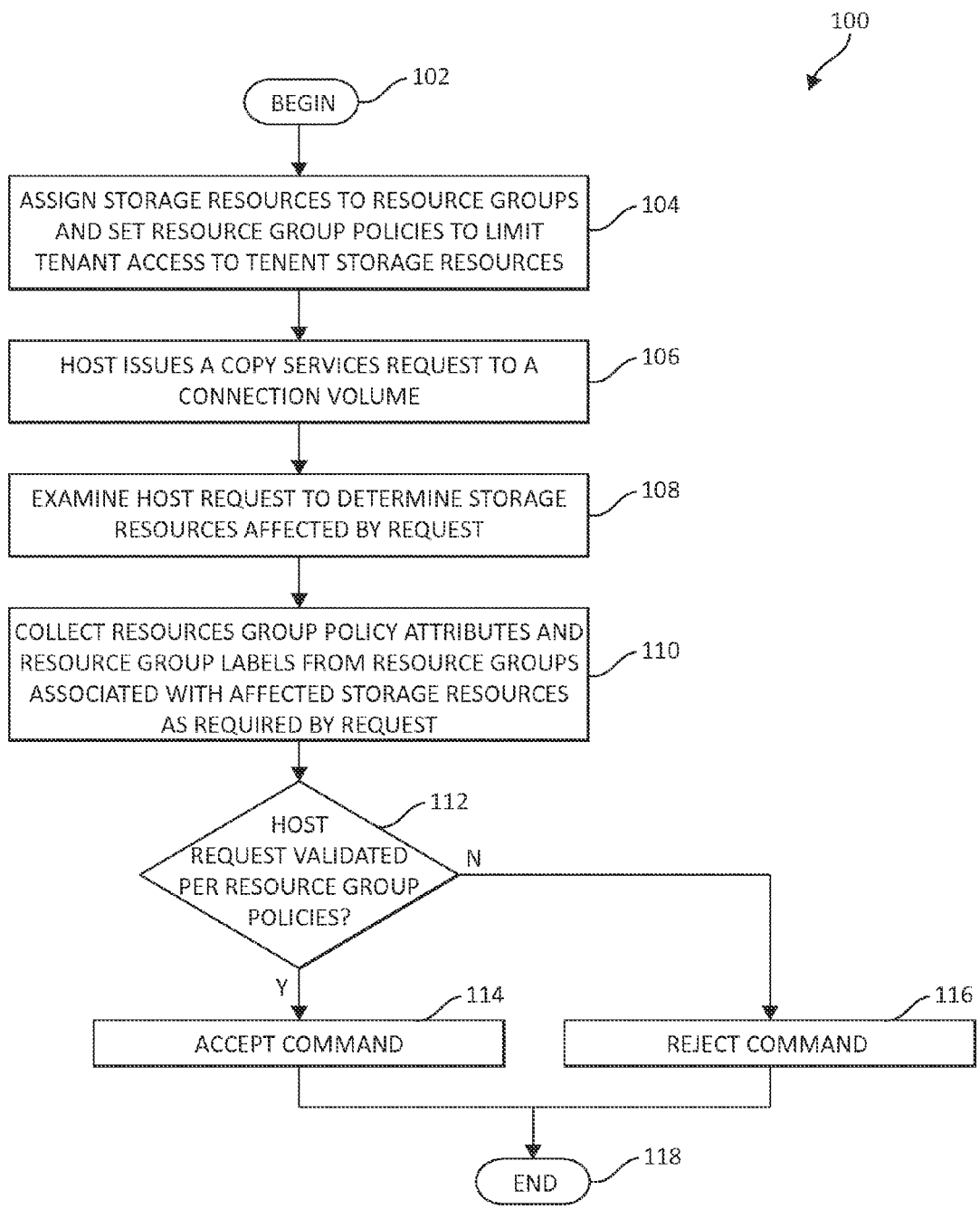
FIG. 5 is a flow chart diagram illustrating an exemplary method for implementing mechanisms for prescribing relationships for limiting host requests for storage operations in accordance with one embodiment of the present invention.

Turning now to FIG. 5, an exemplary method 100 for implementing aspects of the present invention is illustrated in flow chart diagram format. As one of ordinary skill in the art will appreciate, various steps in the methods FIG. 5 and FIG. 6 may be implemented in differing ways to suit a particular application. In addition, the described methods may be implemented by various means, such as hardware, software, firmware, or a combination thereof operational on or otherwise associated with the computing storage environment. For example, the methods may be implemented, partially or wholly, as a computer program product including a computer-readable storage medium having computer-readable program code portions stored therein. The computer-readable storage medium may include disk drives, flash memory, digital versatile disks (DVDs), compact disks (CDs), and other types of storage mediums.

In FIG. 5, the method 100 begins (step 102) by assigning storage resources to resource groups and setting resource group policies to limit tenant access to tenant storage resources (step 104). The method issues a copy services request by the host to a connection volume (step 106). The method includes examining the host request to determine if the storage resources are affected by the host request (step 108). Resource group policy attributes and resource group labels are collected from resource groups associated with affected storage resources as required by the request (step 110). The method determines if host requests are validated per resource group policies (step 112) and, if yes, the command is accepted (step 114). If no, the command is rejected (step 116). The method ends (step 118).

Figure 6A:
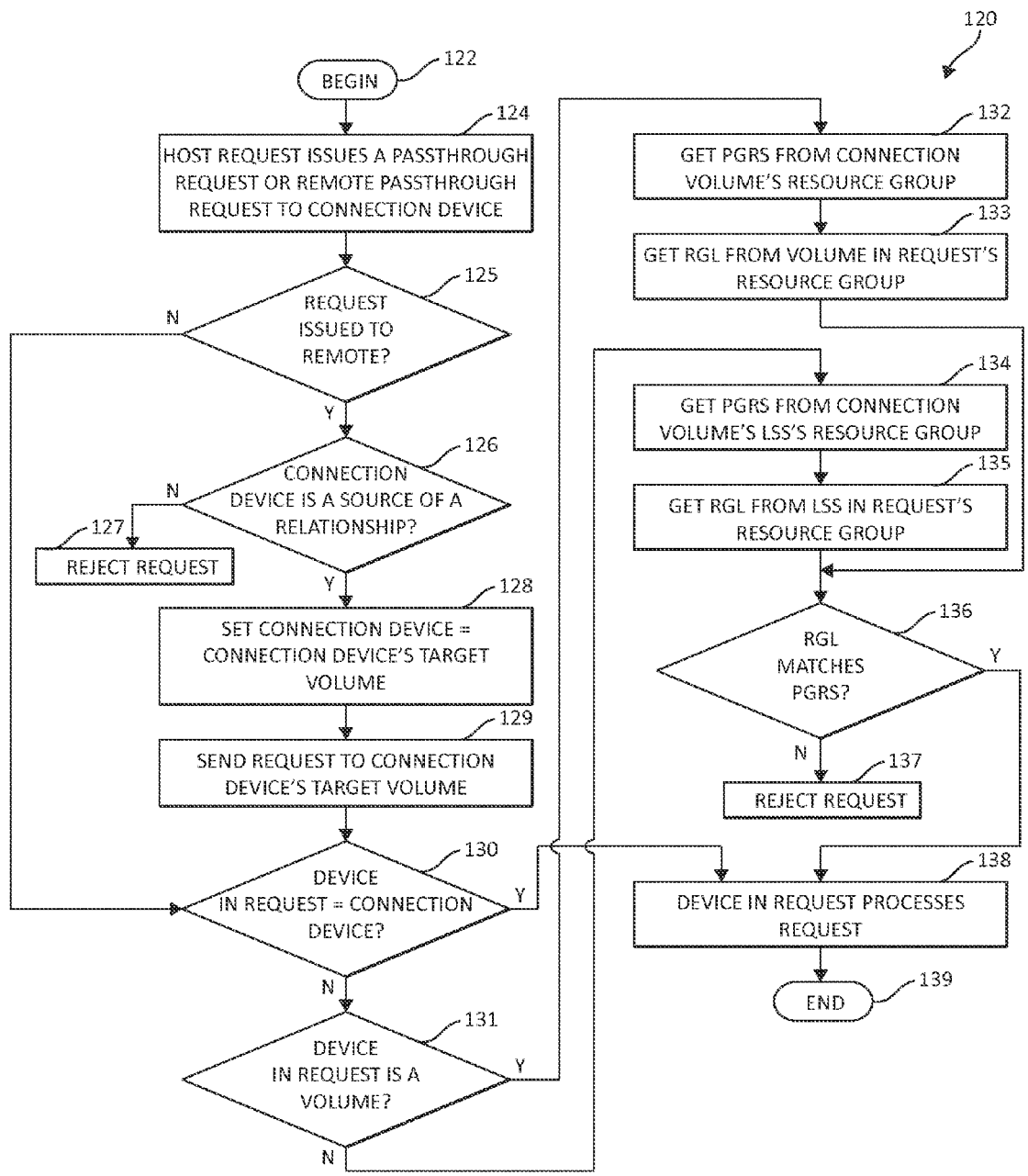
FIG. 6A is a flow chart diagram illustrating an exemplary method for implementing a passthrough global resource scope (PGRS) attribute, in accordance with one embodiment of the present invention.

FIG. 6A, following, illustrates an exemplary method 120 for issuing a passthrough command. The method begins (step 122) by issuing a passthrough request or remote passthrough request to a connection device by a host request (step 124). The method determines if the host request is issued to remote (step 125) and, if no, the method checks if the device in the request is equal to the connection device (step 130). If yes, the method determines if a connection device is a source of a relationship (step 126). If no, the method rejects the request (step 127). If yes, the method checks if the set connection device is equal to the connection device's target volume (step 128). The host request is sent to connection device's target volume (step 129). The method checks to see if the device in request is equal to connection device (step 130). If yes, the device in the request processes the request (step 138). If no, the method checks if the device in the request is a volume (step 131). If no, the method will get PGRS from connection volume's LSS's resource group (step 134) which the includes getting the RGL from LSS in the host request's resource group (step 135) then moves on to determining if the RGL matches the PGRS (step 136). If yes, the method gets the PGRS from the connection volume's resource group (step 132). Next, the method gets RGL from the volume in request's resource group (step 133). The method then determines if the RGL matches PGRS (step 136). If no, the request is rejected (step 137). The method includes the device in the request to process the request (step 138). The method then ends.

In one embodiment, by way of example only, as mentioned in the foregoing, the present invention adds policies to the Resource Group object to limit passthrough commands by adding a Passthrough Global Resource Scope (PGRS) attribute. The PGRS attribute selects one or more resource groups that contain a set of volumes. When a PGRS command is issued to a connection device that operates on a device that is other than the connection device, or an LSS that is other than the connection device's LSS, the policy checks that the destination device/LSS is in a resource group and the resource groups associated resource group label is within the scope of the PGRS.

Figure 6B:
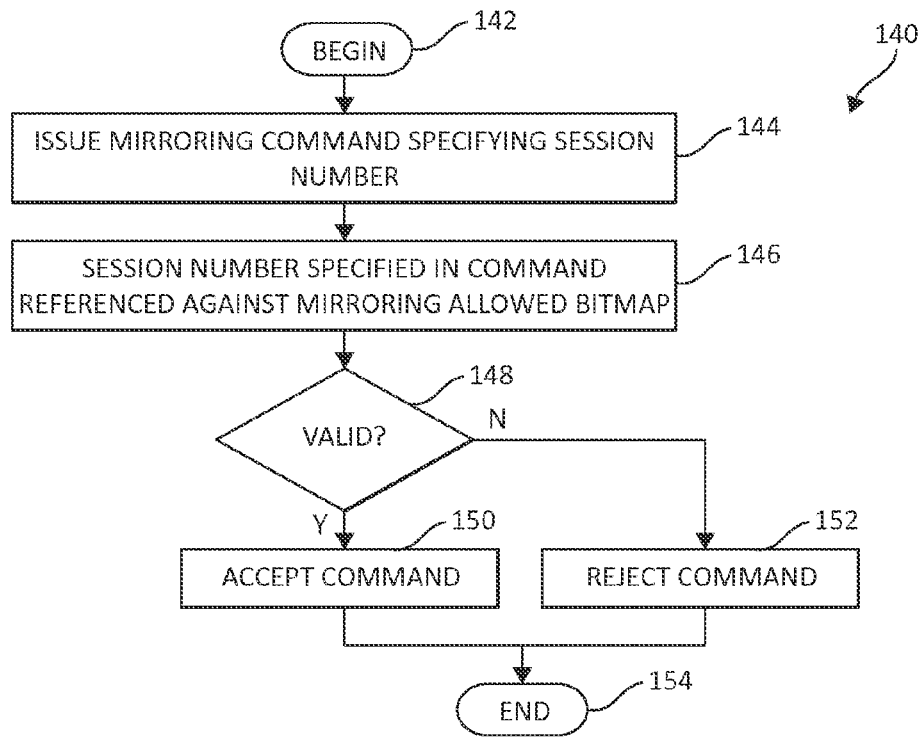
FIG. 6B is a flow chart diagram illustrating an exemplary method for validating a copy services session command using a bitmap, in accordance with one embodiment of the present invention.

FIG. 6B, following, illustrates an exemplary method 140 for issuing a copy services request with a specified session number. The method begins (step 142) and issues a request specifying session number (step 144). A session number specified in the command is referenced against a session allowed bitmap (step 146) and checks the validity (step 148). If valid, the command is accepted (step 150) and, if not, the command is rejected (step 152). The method ends (step 154).

In one embodiment, by way of example only, as mentioned in the foregoing, the present invention limits the GM sessions by adding a "GM Sessions Allowed" bitmap to the resource group where each bit of the mask is associated with a valid session number (e.g. bit 1=session 1). When a CS command is received by an LSS that specifies a session number, the LSS's RG is checked to see if the session number is allowed. If not the command is rejected.

Figure 6C:
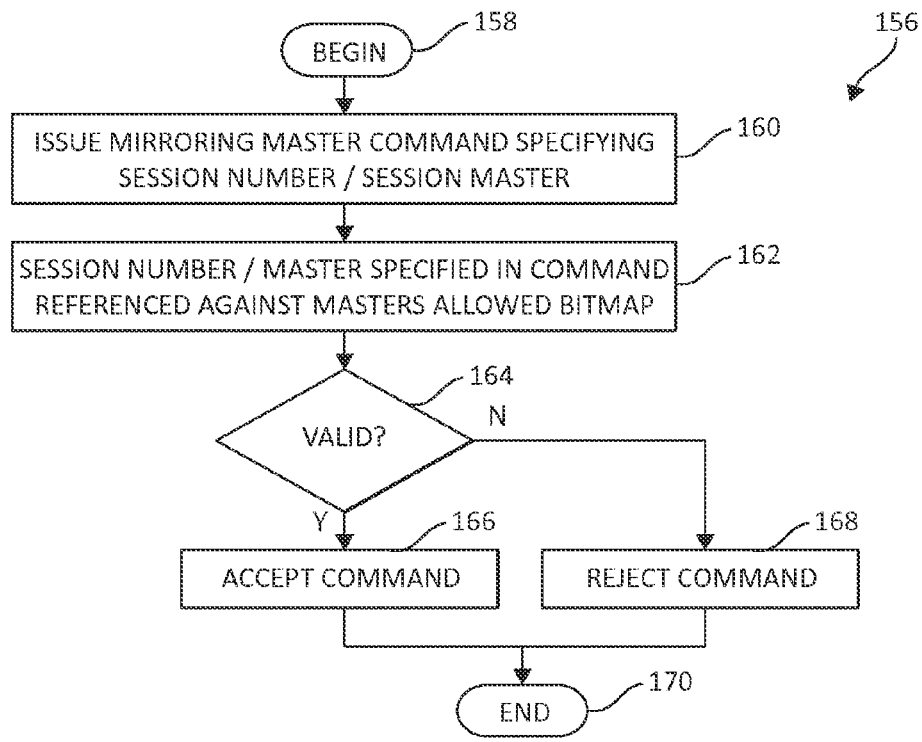
FIG. 6C is a flow chart diagram illustrating an exemplary method for validating a mirroring master command using a bitmap, in accordance with one embodiment of the present invention.

FIG. 6C, following, illustrates an exemplary method 156 for issuing mirroring mastering command. The method begins (step 158) by issuing a mirroring master command specifying a session number (step 160). The session number specified in the command is referenced against the masters allowed bitmap (step 162) and checks the validity (step 164). If valid, the command is accepted (step 166) and, if not, the command is rejected (step 168). The method ends (step 170).

In one embodiment, by way of example only, as mentioned in the foregoing, the present invention limits the GM masters by adding a "GM Masters Allowed" bitmap to the resource group where each bit of the mask is associated with a valid session number (e.g. bit 1=session 1). When a CS command is received through an LSS to manage a GM Session Master, the LSS's RG is checked to determine if (1) the session number is allowed in the "GM Sessions Allowed" mask and (2) the GM Session master is allowed in the "GM Masters Allowed" mask for the specified session number in the CS command. If either bit indicates not allowed the command is rejected.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wired, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagram in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While one or more embodiments of the present invention have been illustrated in detail, one of ordinary skill in the art will appreciate that modifications and adaptations to those embodiments may be made without departing from the scope of the present invention as set forth in the following claims.

What is claimed is:

1. A method of prescribing relationships for storage resources organized into a plurality of resource groups in a computing storage environment by a processor device, the comprising:

for at least one storage resource object associated with at least one of the plurality of resource groups by a resource group attribute, defining at least one policy for limiting host requests to the storage resources in the at least one of the plurality of resource groups to prevent an issuance of the host requests to an unowned one of the storage resources wherein: defining the at least one policy further includes:
establishing a passthrough policy to limit passthrough a Passthrough Global Resource Scope (PGRS) attribute, wherein pursuant to the PGRS attribute, a command issued to a connection device that is accessible by a host system, such command operating on one of a device other than the connection device and a logical subsystem (LSS) other than the LSS of the connection device, is examined to verify one of a destination device and the LSS as associated with a resource group having a resource group label within a scope of the PGRS in the resource group of one of the connection device and LSS, establishing a passthrough policy to limit a plurality of passthrough commands by defining a Passthrough Global Resource Scope (PGRS) attribute, wherein pursuant to the PGRS attribute, a command issued to a connection device that is accessible by a host system and that is operating as the source of a copy relationship is instructed to send the command issued to a target device of the copy relationship which processes the command as a remote connection device, the command operating on one of a device other than the remote connection device and a logical subsystem (LSS) other than the LSS of the remote connection device, is examined to verify one of a destination device and LSS as associated with a plurality of resource groups having a resource group label within a scope of the PGRS in the plurality of resource groups of one of the connection device and LSS, establishing a session usage policy to limit copy service sessions by defining session allowed bitmap, each bit of the session allowed bitmap corresponding to a valid session number, wherein pursuant to the session usage policy, a command received by a logical subsystem (LSS) specifying a session number is referenced against a resource group of the LSS to validate the session number; wherein if the session number is validated, the command is allowed, wherein pursuant to an initiation of at least one mirroring session by at least one host system assigned to at least one tenant, at least one of the storage resources for the at least one tenant assigned to at least one resource group of the plurality of resource groups for the tenant:

determining, by a sessions allowed mask in the resource group, whether the at least one copy services session is allowed to be implemented against the at least one storage resource, wherein the sessions allowed mask facilitates partitioning of which of the at least one mirroring sessions is assigned to which of the at least one tenant, such that no two of the at least one tenants are allowed to manage the same one of the at least one copy services session, and establishing a mirroring master policy to limit mirroring sessions by defining a masters allowed bitmap, each bit of the master allowed bitmap corresponding to a valid session number, wherein pursuant to the mirroring master policy, a command received through a logical subsystem (LSS) to manage a mirroring session master is referenced against a resource group of the LSS to validate the session number and the mirroring session master, wherein if the session number and the mirroring session is validated, the command is allowed, wherein the at least one mirroring session is distributed over at least two storage subsystems, each of the at least one tenant has storage resources assigned to a resource group associated with the at least one tenant, each of the at least one tenant is assigned which of the at least one mirroring session the at least one tenant is permitted to control via a plurality of sessions allowed controls in the resource group associated with the at least one tenant and a collective set of master allowed controls in resource groups of the at least one tenant is used to partition which masters are permitted to operate on which of the at least two storage subsystems.

2. The method of claim 1, wherein the host requests for the storage resources includes a copy services request to the storage resources.

3. A system for prescribing relationships for storage resources organized into a plurality of resource groups in a computing storage environment by a processor device, each of the storage resources having a resource group attribute associating a storage resource object with the plurality of resource groups and associating an at least one policy in the plurality of resource groups with the storage resources, comprising:

a resource management module operational in the computing storage environment, wherein the resource management module is adapted for:

for at least one storage resource object associated with at least one of the plurality of resource groups by a resource group attribute, defining at least one policy for limiting host requests to the storage resources in the at least one of the plurality of resource groups to prevent an issuance of the host requests to an unowned one of the storage resources, wherein defining the at least one policy further includes:

establishing a passthrough policy to limit passthrough commands by defining a Passthrough Global Resource Scope (PGRS) attribute, wherein pursuant to the PGRS attribute, a command issued to a connection device that is accessible by a host system, such command operating on one of a device other than the connection device and a logical subsystem (LSS) other than the LSS of the connection device, is examined to verify one of a destination device and the LSS as associated with a resource group having a resource group label within a scope of the PGRS in the resource group of one of the connection device and LSS, establishing a passthrough policy to limit a plurality of passthrough commands by defining a Passthrough Global Resource Scope (PGRS) attribute, wherein pursuant to the PGRS attribute, a command issued to a connection device that is accessible by a host system and that is operating as the source of a copy relationship is instructed to send the command issued to a target device of the copy relationship which processes the command as a remote connection device, the command operating on one of a device other than the remote connection device and a logical subsystem (LSS) other than the LSS of the remote connection device, is examined to verify one of a destination device and LSS as associated with a plurality of resource groups having a resource group label within a scope of the PGRS in the plurality of resource groups of one of the connection device and LSS, establishing a session usage policy to limit copy service sessions by defining a session allowed bitmap, each bit of the session allowed bitmap corresponding to a valid session number, wherein pursuant to the session usage policy, a command received by a logical subsystem (LSS) specifying a session number is referenced against a resource group of the LSS to validate the session number; wherein if the session number is validated, the command is allowed, wherein pursuant to an initiation of at least one mirroring session by at least one host system assigned to at least one tenant, at least one of the storage resources for the at least one tenant assigned to at least one resource group of the plurality of resource groups for the tenant:
determining, by a sessions allowed mask in the resource group, whether the at least one copy services session is allowed to be implemented against the at least one storage resource, wherein the sessions allowed mask facilitates partitioning of which of the at least one mirroring sessions is assigned to which of the at least one tenant, such that no two of the at least one tenants are allowed to manage the same one of the at least one copy services session.

4. The system of claim 3, wherein the host requests for the storage resources include a copy services request to the storage resources.

5. The system of claim 3, wherein the resource management module is adapted for establishing a mirroring master policy to limit mirroring sessions by defining a masters allowed bitmap, each bit of the master allowed bitmap corresponding to a valid session number, wherein pursuant to the mirroring master policy, a command received through a logical subsystem (LSS) to manage a mirroring session master is referenced against a resource group of the LSS to validate the session number and the mirroring session master, wherein if the session number and the mirroring session is validated, the command is allowed, wherein the at least one mirroring session is distributed over at least two storage subsystems, each of the at least one tenant has storage resources assigned to a resource group associated with the at least one tenant, each of the at least one tenant is assigned which of the at least one mirroring session the at least one tenant is permitted to control via a plurality of sessions allowed controls in the resource group associated with the at least one tenant, and a collective set of master allowed controls in resource groups of the at least one tenant is used to partition which masters are permitted to operate on which of the at least two storage subsystems.

6. A computer program product for prescribing relationships for storage resources organized into a plurality of resource groups in a computing storage environment by a processor device, each of the storage resources having a resource group attribute associating a storage resource object with the plurality of resource groups and associating an at least one policy in the plurality of resource groups with the storage resources, the computer program product comprising a computer-readable storage medium having computer-readable program code portions stored therein, the computer-readable program code portions comprising:
a first executable portion for, for at least one storage resource object associated with at least one of the plurality of resource groups by a resource group attribute, defining at least one policy for limiting host requests to the storage resources in the at least one of the plurality of resource groups to prevent an issuance of the host requests to an unowned one of the storage resources, wherein defining the at least one policy further includes:
establishing a passthrough policy to limit passthrough commands by defining a Passthrough Global Resource Scope (PGRS) attribute, wherein pursuant to the PGRS attribute, a command issued to a connection device that is accessible by a host system, such command operating on one of a device other than the connection device and a logical subsystem (LSS) other than the LSS of the connection device, is examined to verify one of a destination device and the LSS as associated with a resource group having a resource group label within a scope of the PGRS in the resource group of one of the connection device and LSS,
establishing a passthrough policy to limit a plurality of passthrough commands by defining a Passthrough Global Resource Scope (PGRS) attribute, wherein pursuant to the PGRS attribute, a command issued to a connection device that is accessible by a host system and that is operating as the source of a copy relationship is instructed to send the command issued to a target device of the copy relationship which processes the command as a remote connection device, the command operating on one of a device other than the remote connection device and a logical subsystem (LSS) other than the LSS of the remote connection device, is examined to verify one of a destination device and LSS as associated with a plurality of resource groups having a resource group label within a scope of the PGRS in the plurality of resource groups of one of the connection device and LSS,
establishing a session usage policy to limit copy service sessions by defining a session allowed bitmap, each bit of the session allowed bitmap corresponding to a valid session number, wherein pursuant to the session usage policy, a command received by a logical subsystem (LSS) specifying a session number is referenced against a resource group of the LSS to validate the session number; wherein if the session number is validated, the command is allowed, wherein pursuant to an initiation of at least one mirroring session by at least one host system assigned to at least one tenant, at least one of the storage resources for the at least one tenant assigned to at least one resource group of the plurality of resource groups for the tenant:
determining, by a sessions allowed mask in the resource group, whether the at least one copy services session is allowed to be implemented against the at least one storage resource, wherein the sessions allowed mask facilitates partitioning of which of the at least one mirroring sessions is assigned to which of the at least one tenant, such that no two of the at least one tenants are allowed to manage the same one of the at least one copy services session.

7. The computer program product of claim 6, further including a second executable portion for, wherein the host requests for the storage resources includes a copy services request to the storage resources.

8. The computer program product of claim 6, further including a second executable portion for establishing a mirroring master policy to limit mirroring sessions by defining a masters allowed bitmap, each bit of the master allowed bitmap corresponding to a valid session number, wherein pursuant to the mirroring master policy, a command received through a logical subsystem (LSS) to manage a mirroring session master is referenced against a resource group of the LSS to validate the session number and the mirroring session master, wherein if the session number and the mirroring session is validated, the command is allowed, wherein the at least one mirroring session is distributed over at least two storage subsystems, each of the at least one tenant has storage resources assigned to a resource group associated with the at least one tenant, each of the at least one tenant is assigned which of the at least one mirroring session the at least one tenant is permitted to control via a plurality of sessions allowed controls in the resource group associated with the at least one tenant, and a collective set of master allowed controls in resource groups of the at least one tenant is used to partition which masters are permitted to operate on which of the at least two storage subsystems.

* * * * *